United States Patent [19]

Alther

[11] 4,139,994

[45] Feb. 20, 1979

[54] VIBRATION ISOLATOR

[75] Inventor: George A. Alther, Midland, Tex.

[73] Assignee: Smith International, Inc., Newport Beach, Calif.

[21] Appl. No.: 780,671

[22] Filed: Mar. 23, 1977

[51] Int. Cl.[2] .................................... F16D 3/06

[52] U.S. Cl. .................................... 64/23; 64/27 NM; 175/321

[58] Field of Search .......... 64/1 V, 11 R, 23, 27 NM; 175/56, 321; 264/137

[56] References Cited

U.S. PATENT DOCUMENTS

| | | | |
|---|---|---|---|
| 2,198,654 | 4/1940 | Calkins et al. | 64/23 |
| 3,323,326 | 6/1967 | Vertson | 64/27 NM X |
| 3,381,780 | 5/1968 | Stachowiak | 188/86 |
| 3,400,558 | 9/1968 | Haines | 64/23 |
| 3,503,224 | 3/1970 | Davidescu | 64/11 R |
| 3,750,423 | 8/1973 | Williams | 64/23 |

*Primary Examiner*—James L. Jones, Jr.
*Assistant Examiner*—James G. Smith
*Attorney, Agent, or Firm*—Murray Robinson; Ned L. Conley; David Alan Rose

[57] ABSTRACT

A vibration isolator includes telescoping tubular mandrel and barrel members between which torque is transmitted by an internally splined urethane bushing affixed to the cylindrical interior of the steel barrel and a urethane layer over the splined outer surface of the steel mandrel. Axial loads are transmitted in both directions between shoulders on the mandrel and barrel through two annular urethane members, one for each direction, disposed in annular pockets between the mandrel and barrel, which have greater radial thickness than do the rings, allowing room for deformation of the rings by axial loading. A replaceable sliding seal between the upper end of the mandrel and the barrel retains drilling fluid passing through the isolator. A sliding bearing between the mandrel and the lower end of the barrel cooperate with the seal at the upper end of the mandrel to take bending moments.

The urethane annuluses are shaped, e.g. tapered at their ends, to give a desired load-displacement curve, providing a soft cushion initially and gradually increasing stiffness with increased displacement. The urethane annuluses are preloaded in an amount at least equal to the expected set they will take after use, thereby to eliminate any axial play in the isolator. The material and geometry of the axial load transmitting annuluses and their pockets is such that over a wide range of loads the resonant frequency of the isolator for axial vibration is nearly constant and about equal to the lowest expected impact frequency of a three cone rock bit running at typical speed of sixty revolutions per minute, i.e. three cycles per second.

16 Claims, 6 Drawing Figures

VIBRATION ISOLATOR

BACKGROUND OF THE INVENTION

This invention pertains to vibration isolators or dampers and more particularly to such a device to be incorporated in the drill string of apparatus for boring holes in the earth, especially by the rotary method, and is particularly adapted for use in water well drilling and exploration. Such isolators reduce the transmission of undesired movements occurring below the isolator to portions of the drill string thereabove. Such movements, grouped together under the term "vibrations" include both short duration rapid excursions and longer duration more regular excursions of various frequence.

Vibration isolators for isolating torsional or axial vibrations have long been used in the drill strings of apparatus employed for drilling oil wells. See for example expired U.S. Pat. Nos.

2,563,515 — Brown (rubber spline)

2,756,022 — Sturgeon (rubber ring).

Isolators are known in which both axial and torsional vibrations are isolated. In some cases provision is made for a single resilient element to transmit both axial and torsional loads, as in U.S. Pat. Nos.

3,033,011 — Garrett (1962) (annular rubber sandwich)

3,323,327 — Leathers (rubber mandrel).

In other cases, separate resilient means are provided to transmit the axial and torsional loads, as shown for example, in U.S. Pat. Nos.

3,323,326 — Vertson (rubber spline, rubber helix)

3,503,224 — Davidescu (rubber mounted spline, rubber sleeves.

Various shapes and dispositions of rubber axial load means elements are known. See the publications:

"Cougar Shock Tool" — Cougar Tool Co. Ltd.

"Christiansen's Shock-Eze" — Christiansen Diamond Prod. Co. (stack of rubber rings in steel cups)

and U.S. Pat. Nos.:

3,301,009 — Coulter, Jr. (hex-section rings)

3,660,990 — Zerb (loose rubber ring).

Sometimes the resilient axial load means takes load in both directions as in the Garrett, Vertson, and Davidescu patents, supra. Sometimes separate resilient means are used to take axial load in opposite directions as in the Zerb patent, supra. See also the publication "Cougar Shock Tool" mentioned above.

Elastic systems such as the axial load resilient means of vibration isolators should have a resonant frequency at least about as low as the expected frequency of the vibration to be isolated. The resonant frequency of an elastic system employing a resilient element having a constant spring rate is a function of the deflection of the spring, increasing as the deflection decreases. It is for this reason that at least some isolators used in oil field drilling, designed for expected bit loads of the order of one hundred thousand pounds, are relatively ineffective when employed with lightly loaded bits. For example in water well drilling and in exploration, bit loads of five thousand to ten thousand pounds are common and a bit loading of even as high as forty thousand pounds is rare. At a forty thousand pound bit loading, an oilfield isolator intended for use with one hundred thousand pound bit loading may be less effective than desired. If the axial resilient element of a constant spring rate isolator is merely made soft enough to be effective in isolating low frequency vibrations at light load, its length to accomodate the necessary static deflection at full load becomes excessive.

U.S. Pat. No. 3,383,126 — Salvatori (1968) teaches that an axially resilient means may comprise a plurality of stacked wire mesh toruses made of steel or plastic, and that by using varying sizes of wires, the toruses may have different modulii of elasticity and elastic limits, and that by using a variety of such toruses in a stack, there is provided at higher deflections a non-linear response to increased loads, thereby to prevent vibration transmission through toruses which have collapsed at light loads. However it is stated that there is unpredictability in the manufacture of such toruses and that reliance must be placed on an averaging through use of a stack of elements to achieve a desired result.

A publication: Mason Jar and Shock-Eze — Christiansen Diamond Products illustrates various load-deflection characteristics for a number of different vibration dampers. It appears from these curves that in the Christiansen damper a constant resonant frequency of around 3 $H_3$ independent of deflection is achieved over a wide load range up to 50,000 pounds or more. However Christiansen finds it necessary to divide the resilient element into a plurality of units each mounted between two steel cups in order to prevent the polyurethane resilient elements from constraining the telescopic members. Also appears that a permanent preload is employed and no provision is made for absorbing shock in the reverse direction.

In the automotive industry it is known to support the body on the wheel or chassis in a manner to achieve a constant resonant frequency independent of spring deflection over a wide range of deflection. However, the spring means employed is a stack of leaf springs of varying lengths.

Although water well drilling may employ relatively light bit loads, torsional loads may be as high or higher than in oil well drilling, especially when large diameter holes, e.g. 30 inches in diameter, are being bored, and torsional vibration may be severe. It will be apparent that there is a problem involved in providing both for transmission of high torque and isolating torsional vibration.

Reviewing the above referred to prior art methods of attacking the problem, it will be seen that they fall in three categories:

(1) an elastomer sleeve transmits both torque and axial loads.

(2) separate resilient elements transmit torque and axial loads:

(a) torque is transmitted by a splined telescopic joint, one of the splines being made of elastomer and the other of steel.

(b) torque is transmitted through an elastomer sleeve to one of two splined steel telescoping members.

If both torque and axial loads are transmitted through the same resilient element, a compromise must be made as to the characteristics of the element best suited for the two purposes. If a splined telescopic unit is used for torque transmission, a problem arises because of wear on the spline, be it all steel or part elastomer and part steel.

In connection with torsional vibration in drive shafts, some work has been done in the auto industry. See for example U.S. Pat. No.

3,400,558 — Haines.

Haines refers to prior U.S. Pat. Nos.

2,199,926 — Swennes (bonded rubber cushion)

2,971,356 — Reuter et al (polyurethane)

as disclosing resilient drive shafts employing rubber and polyurethane as the flexible elements. The Haines patent on the other hand is directed to a low friction telescopic joint and employs a hard urethane plastics material spline not well suited for vibration damping.

The Swennes patent discloses a rubber cushion layer bonded over a splined shaft. However the splined tube within which the shaft works is all metal.

The Reuter et al patent teaches that one or both members of a splined connection may be made of rubber-like polyurethane plastics material. However, relative axial motion of the splined members is not discussed except to say that the members may be shrink fitted together and that it is important only that one of the members be formed from plastics material and that typically one or the other of the members will be steel.

Various means have been employed for securing a non-metallic serrated bushing or the like to a cylindrical surface. In the previously mentioned Brown patent, a toothed surface is provided on the generally cylindrical member to assist in bonding the bushing. U.S. Pat. Nos.

3,677,817 — Kellner 3,697,141 — Garrett disclose means for securing an internally toothed sleeve to the outer periphery of a drill pipe.

An important element of vibration isolators is the seal between the telescoping members. Replaceable seal means for that purpose is shown in the Garrett patent supra. See also U.S. Pat. No.

3,172,341 — Garrett for a suitable sliding seal.

SUMMARY OF THE INVENTION

A weight isolator embodying the invention is described in a brochure entitled "Shock Sub" vibration dampener by Sii Drilco Industrial (1976).

According to the invention, a vibration isolator includes telescoping relatively axially movable tubular members, with separate resilient means for transmitting torque and axial loads therebetween and isolating torsional and axial vibrations of a drill bit connected to one member from the portion of the drill string above the isolator connected to the other telescopic member. Resilient spline means is employed for torque transmission, both splined surfaces being made of urethane, thereby to provide more resilience for absorbing peak torsional impacts and to reduce the wear occasioned by the cutting of a metal splined member into a urethane splined member axially movable relation thereto. Upper and lower urethane annuluses provide for resilient transmission of direct and reverse axial loads. The annuluses are disposed in annular pockets larger in inner diameter than the outer diameter of the annuluses, and the latter are tapered on their ends. The natural resonant frequency of the isolator relative to axial vibrations is about 2.8 to 3.0 cycles per second. This compares favorably with the lowest expected frequency of axial vibrations to be isolated, corresponding to a three cone rock bit driven by a drill pipe turning at sixty revolutions per minute.

Even though it would normally be expected to be necessary to provide an isolator having a resonant frequency both axially and torsionally well below the load frequency to be isolated, it is found that the subject isolator performs very well. With respect to axial vibrations, apparently the natural damping between drill pipe and well bore is sufficient in conjunction with the spring mounting resonant at load frequency to isolate axial vibrations quite well. Reduction in the axial vibrations transmitted through the isolator appears to be effective in reducing torsional vibrations of the drill string whereby it is sufficient to provide enough torsional resilience merely to absorb peak torque loads.

BRIEF DESCRIPTION OF DRAWINGS

For a detailed description of a preferred embodiment of the invention reference will be made to the accompanying scale drawings wherein.

DESCRIPTION OF PREFERRED EMBODIMENT

Barrel and Mandrel

Figure 1:
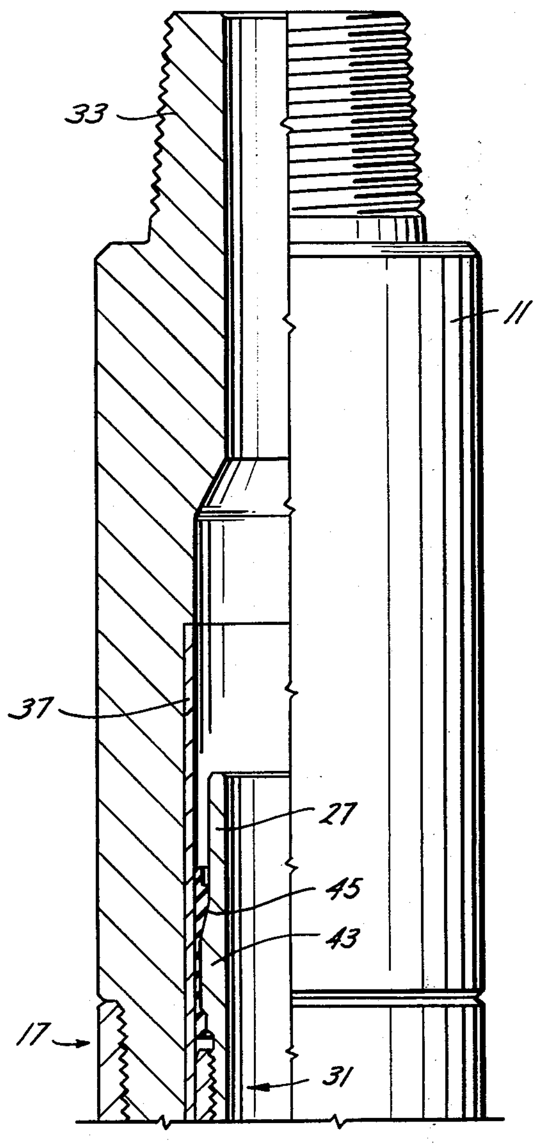
FIGS. 1–4 together form an elevation, partly in section, of a weight isolator embodying the invention.

Referring now to FIGS. 1–4, there is shown a weight isolator including telescoping inner and outer members. The outer member may be called a barrel and the inner member a mandrel.

The barrel includes a tubular connector 11 (FIG. 1), a damper housing 13 (FIG. 2), and a spline shell 15 (FIG. 3), which are connected together by taper threaded rotary shouldered connections as shown at 17 and 19. For a further description of rotary shouldered connections see U.S. Pat. No.

3,754,609 — Garrett.

The mandrel includes a tubular connector 21 formed as one piece with tubular spline shaft 23 (FIG. 3), a damper tube 25 (FIG. 2) and a seal pipe 27. The shaft, tube, and pipe are connected together by taper threaded rotary shouldered connections as shown at 29 and 31.

Connection Means

Referring now to the connectors 11 and 21 at the ends of the isolator, barrel connector 11 is provided with a taper threaded tool joint pin 33 (FIG. 1) for making a rotary shouldered connection with a correlative tool joint box on the lower end of an adjacent drill string member, e.g. a drill pipe or stabilizer or drill collar. Mandrel connector 21 is provided with a taper threaded tool joint box 35 for making a rotary shouldered connection with the upper end of an adjacent drill string member, e.g. a bit.

Seal Means

Referring now to FIG. 1, a cylinder liner 37 is shrink fitted within the cylindrical inner lower end of connector 11. The liner has a smooth inner surface and is made of hard wear resistant metal. Placement of the liner directly in the connector is already known in other vibration dampers. Seal pipe 27 is provided with a body 43 of fusiform configuration, to which is bonded a rubber seal sleeve 45, as disclosed in greater detail in U.S. Pat. No.

3,232,186 — Garrett

Seal sleeve 45 slides within liner 37 as the barrel and mandrel move relative to each other and maintains a seal therebetween, whereby fluid is transmitted between the barrel and mandrel. When the sleeve and liner wear out, they are easily replaced.

Bearing Means

Figure 4:
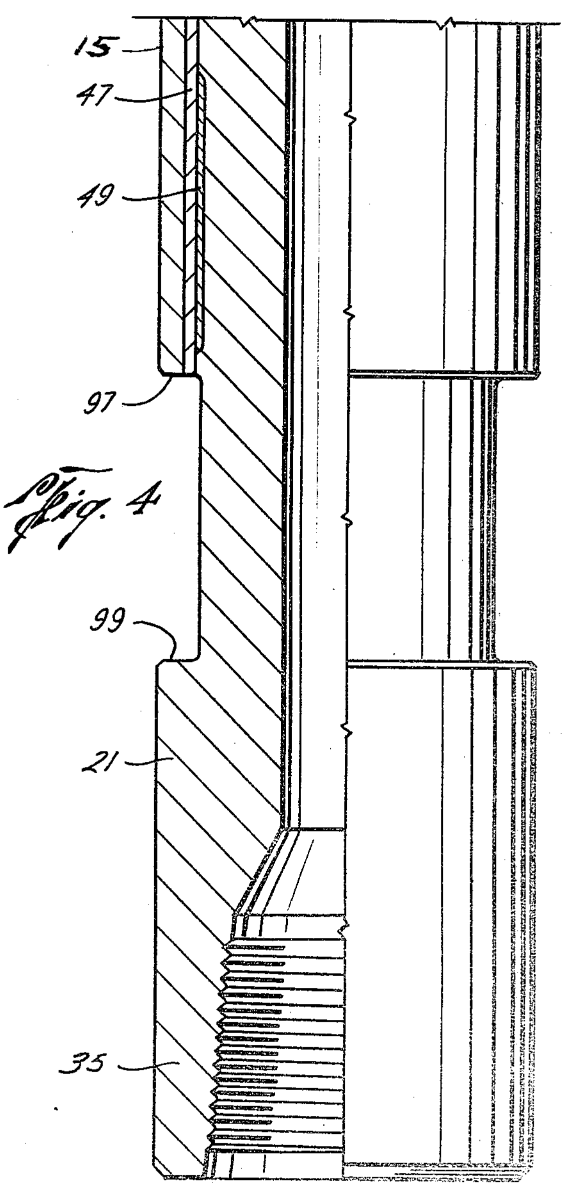

Referring now to FIG. 4 the lower end of spline shell 15 is provided with a wear bushing 47, and an upper portion of connector 21 is provided with a wear sleeve 49 which slides within bushing 47 when the barrel and mandrel move relative to each other. The bushing and sleeve provide bearing means which coacts with the seal means, previously described, to take bending moments applied to the isolator.

Torsional Load Means

Figure 3:
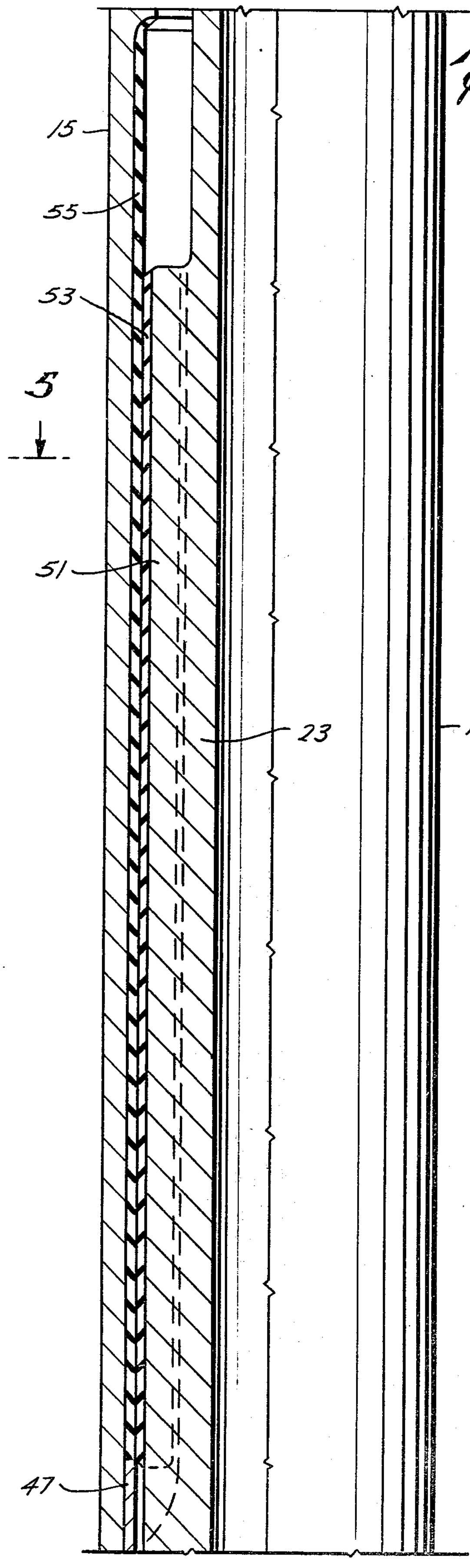
Figure 5:
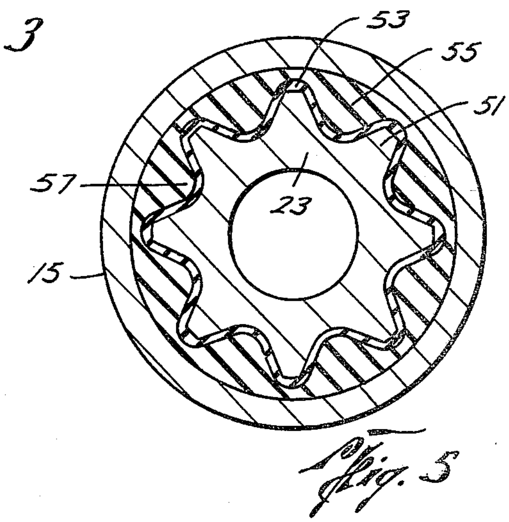
FIG. 5 is a section taken at plane 5—5 of FIG. 3.

Referring now to FIGS. 3 and 5, there is shown elastomer spline means for transferring torsional loads between the barrel and mandrel while providing a shock absorber to reduce transmission of sudden torque loads therebetween and allowing relative axial motion so that axial loads are transmitted only by the separate axial load means described hereinafter.

The spline means includes the tubular steel spline shaft 23, whose outer surface is of sinuous, approximately sinusoidal, cross-section (FIG. 5) forming a plurality of axially extending splines. The spline crests are nearly flat but the corners where the crests join the spline flanks are rounded. The spline shaft may be made, for example, of AISI 4140/4145 heat treated steel.

Bonded to the surface of the splines is a layer 53 of elastomeric material, i.e. polyurethane. The hardness of this material is chosen to give a compromise between the hardness needed to prevent too rapid wear and the softness characteristic of sufficient compliance to provide the desired amount of shock absorbing.

A suitable material for cover 53 and other urethane elastomer parts employed in the subject isolator is a polyurethane compound available as TDW number PL 020 of T. D. Williams Company, Tulsa, Okla. It has a durometer hardness on the Shore A scale of around 90. The material has a low hysteresis, preventing heat build up. It is abrasion resistant and has a low coefficient of friction. Other equivalent material may be employed.

Cover 53 has a thickness of about ¼ inch in the case of an isolator having a barrel whose outer diameter is 8¼ inches. The cover is of uniform thickness on the flanks of the splines but is thicker over the spline crests where its outer surface is rounded. The cover is preferably slightly thinner at the bottoms of the valleys between the splines, thereby to provide increased flank surfaces on the splines, since it is at the flanks that torque is transmitted.

The cover is bonded to the spline shaft with suitable cement and is molded and cured in situ.

The elastomer spline means further includes spline shell 15, within which is bonded and molded and cured in situ a polyurethane elastomer bushing 55. Bushing 55 is cylindrical on its outer periphery but is formed with splines 57 on its inner periphery. Splines 57 are correlative to the outer periphery of cover 53 on the spline shaft 51, which is approximately sinusoidal. There are eight splines on shaft 51 and eight splines on bushing 55.

Axial Load Means (1) In General

Figure 2:
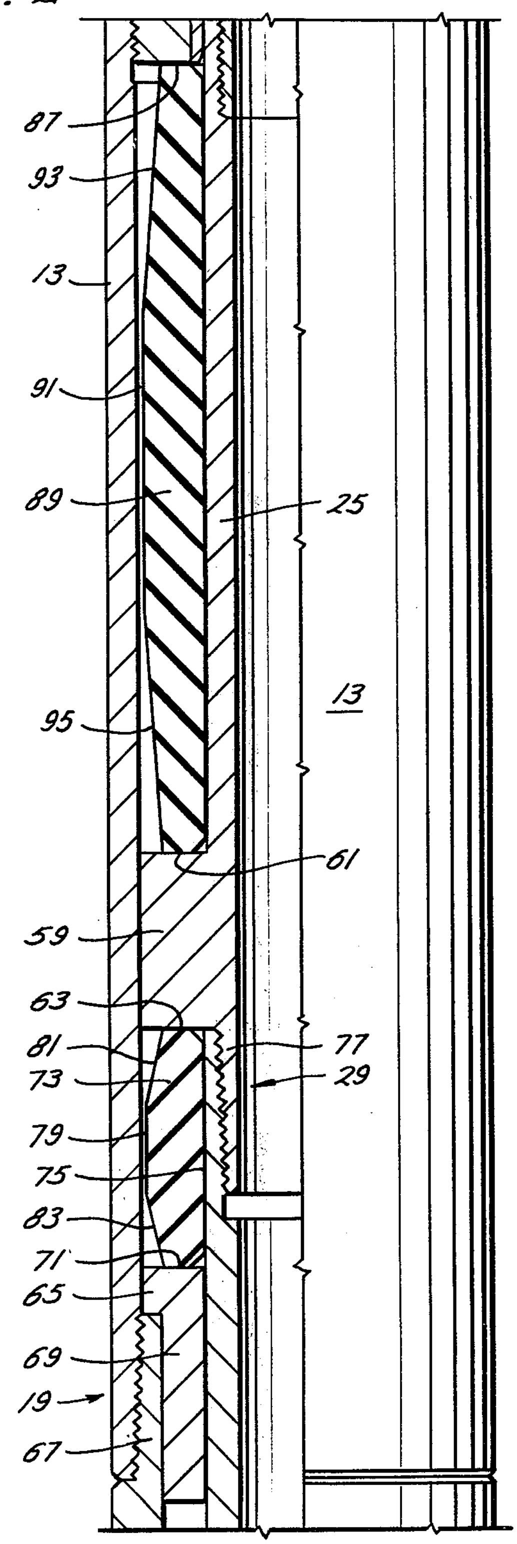

Referring now to FIG. 2 there is shown elastomer shock absorbing and vibration isolating axial load transfer means. Such means includes damper tube 25 and damper housing 13. Tube 25 is provided with an external radial flange 59 which forms upwardly facing shoulder 6T and downwardly facing shoulder 63.

(ii) Reverse Loading Axial Load Means

Near the lower end of housing 13 a support ring 65 rests on the upper end of the threaded pin formed on spline shell 15. Ring 65 has a neck 69 extending down inside pin 67 which centers the ring. Neck 69 makes a sliding fit with the interior of pin 67. Ring 65 provides an upwardly facing shoulder 71.

Between ring shoulder 71 and flange shoulder 63 is disposed elastomer ring 73, the inner periphery of ring 73 makes a sliding fit with the cylindrical outer periphery of threaded box 75 on the upper end of the spline shaft, where the latter connects to threaded pin 77 on the lower end of the damper tube. Ring 73 is made of polyurethane, the same as the material of spline cover 53 and spline bushing 55.

Ring 73 is of smaller outer diameter than the inner diameter of damper housing 13 therearound, forming an annular space 79 therebetween. The inner periphery of ring 73 is cylindrical and its outer periphery is cylindrical except at its ends 81, 83, which are tapered, e.g. conical. This shape for ring 73 provides a spring rate (ratio of force to axial deformations when the ring is axially compressed) which is low at light loads and increases with heavier loads as the outer periphery of the ring first contacts the damper housing and then engages it over larger and larger areas.

Ring 73 is the resilient element of the reverse load axial load means. It is loaded when the isolator is in tension, e.g. when the bit connected at the lower end of the drill string is off bottom, or when the load on the bit is less than the force due to fluid pressure differential on the mandrel which creates the "pump apart" effect. Since water well drilling fluid pressure is usually of the order of only a few hundred pounds per square inch, compared to several thousand psi in the case of oil well drilling, as soon as the weight of one drill collar is placed on the subject isolator it will be placed in compression and the resilient element (ring 73) of the reverse load axial load transfer means will be unloaded. The reverse axial load transfer means therefor functions primarily only when the bit is lightly loaded or when the drill bit is being lifted out of the wellbore. For this reason it need not remain soft over a wide range of deformation and is relatively short in length, e.g. having a length less than its outer diameter and about equal to its inner diameter. In other words, the ring has a length of the same order of magnitude as its average diameter.

As shown in the drawing, the thickness of ring 73 at its untapered portion is about 90% of the thickness of the annular pocket formed between damper housing 13 and the box 75 within which the ring is disposed, and the taper on the ends of the outer periphery of the ring is about ½ inch per inch on diameters, extending over about ⅓ of the length of the ring at each end. The inner edges of the ends of the ring are bevelled to facilitate slipping the ring over the damper tube, either end first.

(iii) Direct Load Axial Load Means

The lower end of top connector 11 provides a downwardly facing shoulder 87. Between downwardly facing shoulder 87 and upwardly facing shoulder 61 on damper tube flange 59 is disposed elastomer sleeve 89. Sleeve 89 is made of polyurethane, the same material as ring 73. Sleeve 89 makes a sliding fit with the cylindrical outer periphery of damper tube 25. The inner edges of the ends of sleeve 89 are bevelled to facilitate slipping it over the damper tube during assembly.

Sleeve 89 is of smaller outer diameter than the inner diameter of damper housing 13 therearound, leaving an annular space 91 therebetween. The inner periphery of sleeve 89 is cylindrical and its outer periphery is cylindrical except at its end 93, 95 which are tapered, e.g. conical. As with ring 73, this shape provides a spring rate which is low at light axial compressive loads and increases with heavier loads as the outer periphery of the sleeve first contacts the damper housing and then engages the housing over increasing areas of contact.

Sleeve 89 is the resilient element of the direct load axial load means. It is loaded when the isolator is contracted from the zero load or neutral position shown in the drawings, just the opposite of ring 73 which is loaded when the isolator is extended from the neutral position.

Even at zero external load, with the isolator in the neutral position, there is some compression of the ring and sleeve when the isolator is initially assembled. This preloading is effected by making the ring and sleeve of a combined unstressed length longer than the annular pockets between the damper tube and damper housing in which they are disposed. The preloading compensates for the fact that the urethane compound of which these resilient elements are formed takes a certain amount of permanent set under load. After a while, the sleeve and ring merely fit snugly axially within their respective pockets, i.e. there is no play and no appreciable preload.

Sleeve 91 must isolate vibration over the range of bit loading expected in use. For greatest economy of space, the shape factor of the sleeve should be such as to produce a constant resonant frequency for the isolator with respect to axial vibrations.

The axial resonant frequency is a function of axial deflection as follows:

$$f = (\tfrac{1}{2}\text{ pi})\,(386/\text{effective deflection})^{\frac{1}{2}}$$

where f is in Hertz and the effective static deflection, measured in inches, is the difference between the total deflection and the abscissa intercept of the tangent to the force-deflection curve at a point on the curve corresponding to the total deflection. See: "Rubber Springs Design" — E. F. Gobel at page 68–73.

With a constant spring rate, the effective deflection is equal to the total deflection, and as the load increases the resonant frequency decreases. In a vibration isolator, if a constant spring rate resilient element is employed and the resonant frequency is made low enough at expected light loads, at heavy loads the isolator will have a lower than necessary resonant frequency and an unduly long static deflection.

According to the invention the weight isolator is provided with a direct axial load resilient element which gives the isolator a nearly constant axial vibration resonant frequency of about three cycles per second, more or less, constant over the expected range of loading of the isolator, e.g. from about three thousand up to about twenty thousand pounds or so. This is achieved by shaping the resilient element and spacing the periphery from the annular pocket in which it is disposed so that the square root of the effective deflection remains fairly constant over the desired range of loading.

Figure 6:
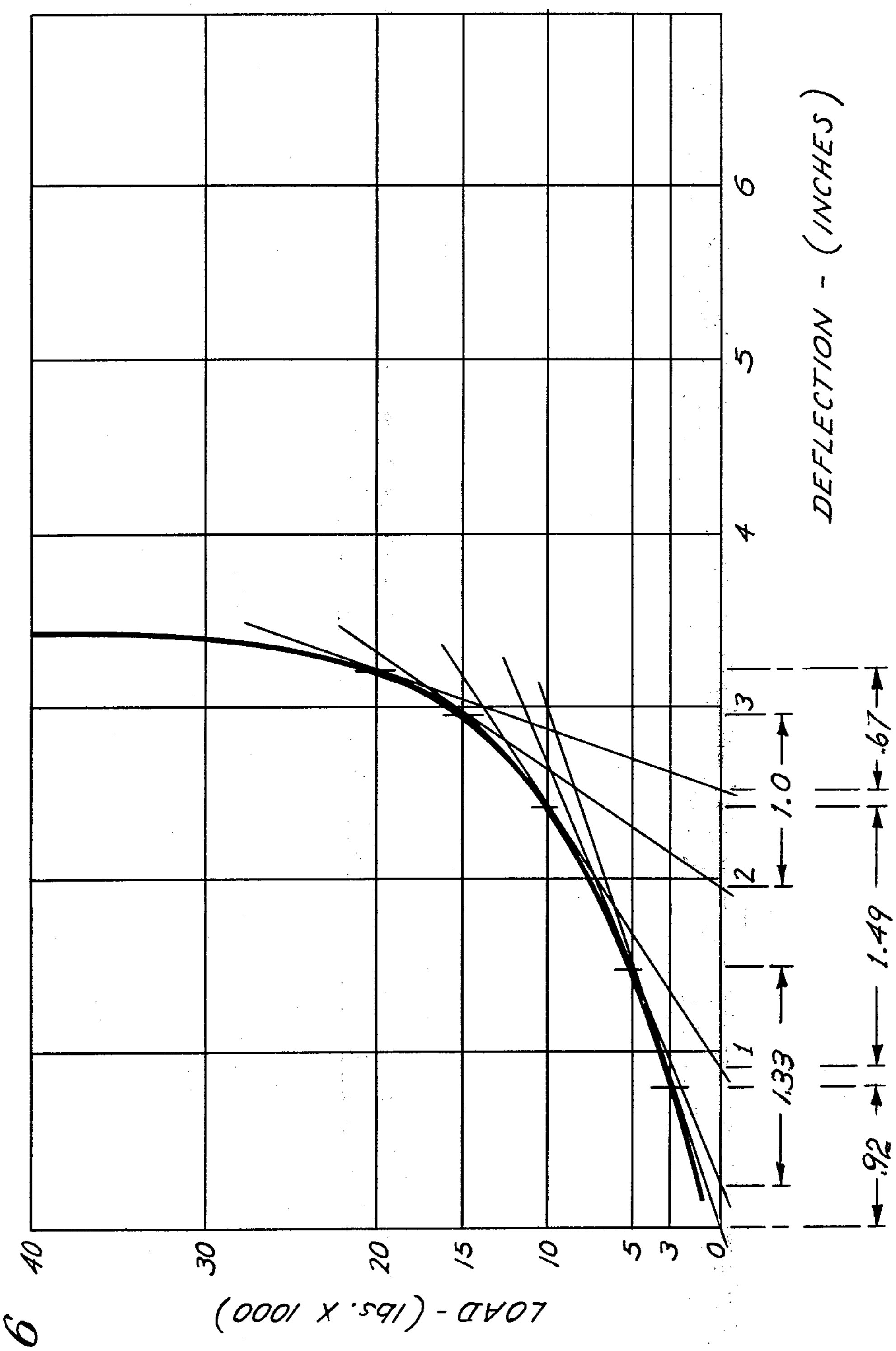
FIG. 6 is a graph of load versus deflection for a weight isolator embodying the invention.

FIG. 6 illustrates the load-deflection curve for a vibration isolator embodying the invention. From this curve and the formula for resonant frequency, the following chart has been prepared showing the relation of the load to the resonant frequency: ,190

Over the range of the chart, the frequency remains constant at 3 Hertz, plus or minus one Hertz or less. Within the load range of 5,000 to 15,000 pounds, the frequency is constant at 3 Hertz within twenty percent.

As with the reverse load resilient element 73, sleeve 89 has a thickness at its cylindrical or mid portion of about 90% of the thickness of the annular pocket formed between the damper tube and damper housing, within which pocket the sleeve is disposed. However sleeve 89 is much longer than ring 73 and the tapers on its ends are much longer and more gradual. For example the ratio of outer diameter to length for the sleeve may be only 38% for the sleeve compared to 134 percent for the ring. The sleeve may have a diametral taper of one and three-quarters inch per foot. As with ring 73, the tapered portions of sleeve 89 extend over nearly a third of its length at each end.

The foregoing may be expressed by noting that the sleeve may occupy from about sixty to ninety percent of the pocket within which it is disposed. In the case of the 8$\frac{1}{4}$ inch diameter isolator shown in the drawing, sleeve 89 occupies about 80% of its pocket and ring 73 occupies about 83% of its pocket. In a contemplated smaller size isolator, namely a five inch diameter tool, the volumes are about 65 to 70%. The smaller tool requires the same stroke, e.g. three inches, to get the resonant frequency down to the desired 3 Hertz, so there must be provided more room for expansion of the sleeve.

Axial Travel Range

As noted above, sleeve 89 accomodates an axial travel of about three inches before it goes solid with the sleeve occupying all of the available volume. Ring 73 has about one third the length of sleeve 89 and allows for about one inch of axial travel. The travel range is thus about 4 inches. If it is desired to make an isolator having a constant resonant frequency over a wider range of loads, the travel range might be increased, e.g. to six inches for a range of up to perhaps thirty or forty thousand pounds of axial load, although the desired result could be achieved also by other modifications.

No special travel limit stop means are provided on the subject isolator. Should the urethane ring (or sleeve) be extruded out of its pocket, the flange 59 provides a positive metal stop engageable with shoulder 71 (or 87) to keep the barrel and mandrel from coming apart. This is in addition to the travel limits provided by the spline and by shoulders 97, 99 (FIG. 4) with respect to contraction of the isolator. The latter travel limits are of course greater than the expected range of axial travel of the barrel and mandrel while sleeve 89 and ring 73 are effective, i.e., not yet gone solid. The spline means must allow at least this amount of axial travel.

Assembly

The procedure for assembly of the subject vibration isolator is as follows:

1. Clamp spline shell on a breakout machine (torque applicator). Apply clamp (chain) close to threaded pin at upper end thereof, e.g. one inch from pin shoulder.
2. Slide spline shell over spline shaft until the lower end of the shell is at the lower end of the bearing.
3. Slide the support ring over the upper end of the spline shaft and into the upper end of the spline shell until it shoulders against the pin.
4. Slide the urethane ring over the box at the upper end of the mandrel.

5. Insert the pin on the lower end of the damper tube into the box at the upper end of the spline shaft and torque up the threaded connection to 6,000 pound-feet. Prior to making up the connection apply a liberal amount of thread dope to the threads and shoulders. Apply tongs to the flange forming the largest outer diameter portion of the damper tube. Do not tong on the smaller diameter portion.
6. Slide the direct load urethane sleeve into position on the damper tube.
7. Install the pin of the seal piston in the box at the upper end of the damper tube and torque up to 2,000 lb.-feet. (a 48 inch pipe wrench with cheater bar may be used with 330 lbs. on a 6 foot arm). Be careful not to damage rubber.
8. Slide damper housing over urethane sleeve and ring and torque the $7\frac{5}{8}$ inch threaded connection between damper housing and spline shell to 28,000 lb.-ft. Apply a liberal amount of dope to threads and shoulders prior to make up.
9. Unclamp breakout machine from spline shell and reclamp on damper housing, approximately 4 inches from the mouth of the box. Apply a liberal amount of thread dope to threads and shoulders and install top connector. Torque connection to 28,000 lb.-ft.
10. Prior to shipment, install thread protectors (not shown) on each end of the isolator.

The rotary shouldered taper threaded connections between the several parts of the isolator may be of the type known by the tradename DI 31, but any rugged connection may be employed.

While a preferred embodiment of the invention has been shown and described, modifications thereof can be made by one skilled in the art without departing from the spirit of the invention.

I claim:

1. An isolator adapted for use in the drill string of rotary drilling apparatus to isolate the portion of the drill string above the isolator from axial vibrations and torsional shocks occurring in the portion of the drill string below the isolator, said isolator including a barrel and a mandrel telescopically associated and connected by resilient axial load transfer means and by resilient torque transfer means, said resilient torque transfer means comprising spline means allowing relative axial movement of the barrel and mandrel under the constraint of said axial load transfer means, said spline means including an elastomeric spline on said mandrel and an elastomeric spline on said barrel arranged for relative axial motion while resiliently transferring torque.

2. Isolator according to claim 1,
said elastomeric splines being made of urethane having a Shore A scale durometer hardness of around 90, plus or minus five.

3. Isolator according to claim 1,
said resilient axial load transfer means including a single sleeve of elastomeric material shaped to provide a resonant frequency that is constant within plus or minus twenty percent over a load range from about five to fifteen thousand pounds.

4. Isolator according to claim 1,
said resilient axial load transfer means including a sleeve having a cylindrical inner peripheral surface slidably engaging an outer peripheral cylindrical surface on the mandrel and being disposed in an annular pocket formed between the mandrel and barrel with an outer peripheral portion of the sleeve radially spaced from the inner periphery of the portion of the barrel facing said pocket when said sleeve is unstressed but free to move radially outwardly without external constraint into engagement with said inner periphery upon axial loading of the sleeve, said sleeve being shaped to provide said axial load transfer means with a resonant frequency of the order of three hertz plus or minus one hertz over a load range from about three to twenty thousand pounds.

5. Isolator according to claim 4,
said elastomeric splines and said sleeve being made of urethane having a Shore A scale durometer hardness of around 90, plus or minus five.

6. Isolator according to claim 1,
said axial load transfer means including a resilient sleeve taking load in one direction and a resilient ring taking load in the reverse direction.

7. Isolator according to claim 6,
said ring having a length of the same order of magnitude as its average diameter,
said sleeve having a length of the order of three times its outer diameter.

8. Isolator according to claim 1,
said axial load transfer means including annular pocket means between said mandrel and barrel and annular resilient means in said pocket means, said pocket means having a greater volume that said resilient means, the radial thickness of said annular resilient means varying along the length thereof, said annular resilient means being cylindrical on its inner periphery fitting closely around said mandrel, said pocket means having ends and said annular resilient means having end surfaces at least portions of which are adjacent to the surfaces of said ends of the pocket means,
said annular resilient means including an elastomer sleeve to take direct axial load and an elastomer ring to take reverse axial load.

9. A vibration isolator according to claim 8,
said axial load transfer means having a resonant frequency with respect to axially travelling vibrations of between two and four cycles per second over a range of axial loading from three to twenty thousand pounds.

10. A vibration isolator comprising
a mandrel
a barrel telescopically receiving the mandrel,
transfer means connecting the barrel and mandrel for transferring axial force, torque, bending moment and fluid therebetween,
means carried by the mandrel for making connection with a drill string member, and
means carried by the barrel for making connection with a drill string member,
said transfer means including axial load transfer means for transferring compressive loads which has a resonant frequency with respect to axially travelling vibrations that is constant within plus or minus 20% over a range of axial loading from five to fifteen thousand pounds,
said axial load transfer means including a resilient sleeve having an inner cylindrical peripheral surface slidably engaging an outer peripheral cylindrical portion of the mandrel and having an outer cylindrical surface radially spaced from the inner periphery of the barrel when the isolator is without load but which is free of constraint relative to radial outward motion to cause said outer cylindrical surface to bulge out into contact with said barrel upon a certain loading of the isolator and to contact larger areas of the barrel with increasing load on the isolator, said sleeve being tapered on its outer periphery, said transfer means including spline means to transfer torque while allowing relative axial motion of the barrel and mandrel, said spline means including a shaft having an external spline whose surface is made of polyurethane and a shell having an internal spline made of polyurethane, the polyurethane portions having a durometer hardness of between 85 and 95 on the Shore A scale, said spline means having a travel range free of axial constraint of at least the same extent as the maximum deflection of the means for transferring axial loads within said range of loads.

11. An isolator adapted for use in the drill string of rotary drilling apparatus to isolate the portion of the drill string above the isolator from vibrations and shocks occurring in the portion of the drill string below the isolator, said isolator comprising:

a mandrel, a barrel telescopically receiving the mandrel, two means for making connection with a drill string member, one of said two means being carried by the mandrel and the other by the barrel, and transfer means connecting the barrel and mandrel for transferring axial force, torque, bending moment and fluid therebetween, including axial load transfer means for transferring axial loads, said axial load transfer means including a portion of said mandrel having an outer periphery that is cylindrical and continuous to form a tube and a portion of said barrel having an inner periphery that is cylindrical and continuous to form a tube, said tubes being radially separated over a length thereof to form an annulus and said axial load transfer means further including two annular shoulders, one on each tube, at the ends of the annulus, closing the annulus to form an annular pocket, for each relative axial position of said tubes there being a certain volume defined by the space enclosed by said pocket, said axial load transfer means further including an annular resilient member in said annular pocket bearing at its ends against said shoulders and having an inner cylindrical peripheral surface slidably engaging said cylindrical outer periphery of said portion of the mandrel and having an outer cylindrical surface which when the isolator is without load is spaced from said cylindrical inner periphery of said portion of the barrel and is free of constraint relative to radial outward motion to cause said outer cylindrical surface to bulge out into contact with said cylindrical outer periphery of said portion of the mandrel upon a certain axial loading of the isolator and to contact larger areas of said cylindrical inner periphery of said portion of the barrel with increasing load on the isolator, such increase in load causing a decrease in the axial extent of said resilient member and a decrease in said certain volume of said annular pocket, said isolator having a working range of relative axial motion of said barrel and mandrel extending from the unloaded position of the isolator to a loaded position in which the resilient annulus has bulged out into full contact with said cylindrical inner periphery of said portion of the barrel, said tubes having sufficient rigidity that further bulging of the resilient member after it fills said volume of the pocket is prevented by said tubes to the extent that further relative axial motion of said barrel and mandrel without extrusion of the resilient member between said shoulder and adjacent tube surfaces is substantially prevented by said resilient member thus going solid within said pocket, said axial load transfer means load having a spring rate which is low at light axial loads and increases with heavier loads.

12. Isolator according to claim 11 including a second resilient means like the first said resilient means, one of said resilient means taking axial loads upon contraction of the length of said isolator and the other of said resilient means taking axial laods upon extension of the length of said isolator.

13. Isolator according to claim 11, said transfer means including means providing a sliding seal between said barrel and mandrel, said portion of said mandrel that forms a tube providing a fluid conduit, and spline means between said barrel and mandrel to transfer torque therebetween, said portion of said barrel that forms a tube transmitting torque to said spline.

14. Isolator according to claim 11, said resilient means for transferring axial loads having a resonant frequencey with respect to axially travelling vibrations that is constant within plus or minus twenty percent over a range of axial loading from five to fifteen thousand pounds.

15. Isolator according to claim 11, said transfer means including means to seal between said mandrel and barrel positioned upstream of said resilient means with respect to an assumed direction of fluid flow from inside to outside of the isolator, there being no seal between the mandrel and barrel downstream of said resilient means.

16. Isolator according to claim 11, said resilient means comprising a single sleeve taking compressive loads on said isolator, said sleeve having a length greater than its outer diameter, the outer periphery of the sleeve being tapered at both ends over of the order of about a third of its length at each end.

* * * * *